Dec. 10, 1929.                C. N. RACE                1,739,373
                        COLORIMETER APPARATUS
                         Filed July 8, 1927
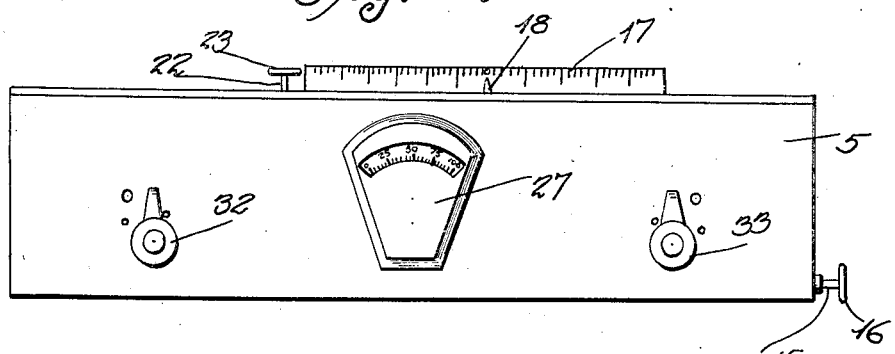
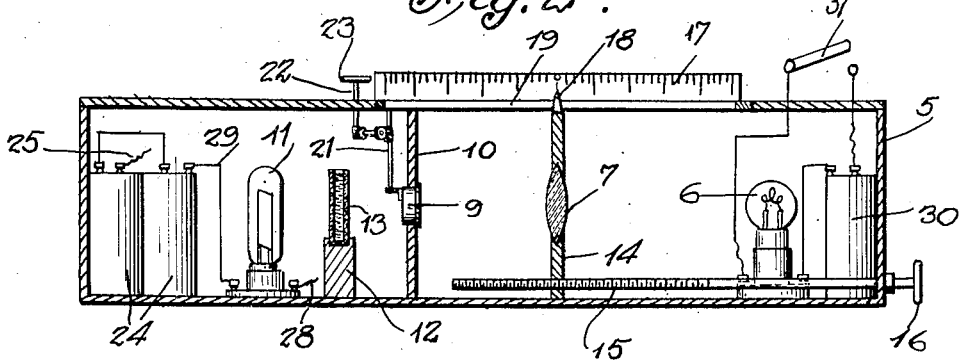
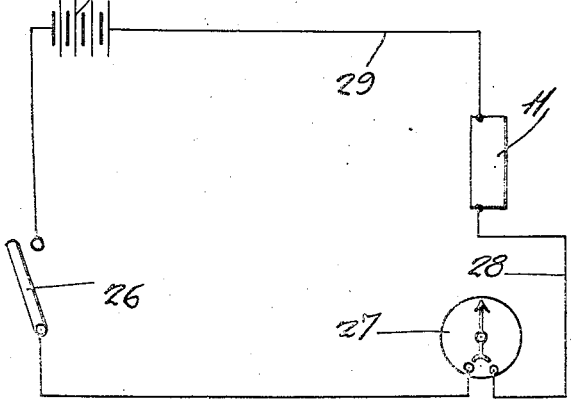
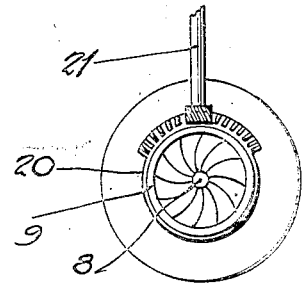
INVENTOR.
Charles N. Race
BY
ATTORNEY.

Patented Dec. 10, 1929

1,739,373

UNITED STATES PATENT OFFICE

CHARLES N. RACE, OF CARO, MICHIGAN

COLORIMETER APPARATUS

Application filed July 8, 1927. Serial No. 204,357.

This invention relates to an improved colorimeter apparatus for use in quantitatively estimating the color of substances without depending upon the eye for color comparison.

The present invention is primarily adapted for use in estimating the quantity of hemoglobin in the blood, and an object of the invention is to provide an apparatus of the above kind in which a light may be projected through the substance or specimen and received by a selenium cell in circuit with a suitable registering instrument, and in which means is provided for adjusting the intensity of the light projected through the substance or specimen for obtaining a given reading on the registering instrument, whereby the color of the substance or specimen may be determined by noting the reading on the scale of the light intensity adjusting means and comparing said reading with similar readings for standard specimens of known different colors or light absorption power.

A further object is to provide an improved apparatus of the above kind in which the intensity of the light to which the substance is subjected, is varied by changing the focus of the light with respect to said substance, and in which proper passage of the light to the substance is controlled by an adjustable diaphragm interposed between the light focusing means and the substance.

Other objects will appear as the nature of the invention is better understood and the same consists in the novel form, combination and arrangement of parts hereinafter more fully described, shown in the accompanying drawing and claimed.

In the drawings, wherein like reference characters indicate corresponding parts throughout the several views, Figure 1 is a front elevational view of a colorimeter apparatus constructed in accordance with the present invention;

Figure 2 is a view thereof partly in front elevation and partly in vertical longitudinal section;

Figure 3 is an enlarged fragmentary detail view showing the adjustable diaphragm for controlling the passage of light to the substance or specimen; and Figure 4 is a wiring diaphragm of the circuit for the selenium cell and registering instrument.

In the construction of the device shown in the drawings, I employ a substantially light-tight box 5 in one end of which is mounted an incandescent lamp 6. A condensing lens 7 is mounted in the box 5 adjacent and for movement toward or away from the lamp 6, for rectifying and changing the focus of the light rays before they are passed through the adjustable opening of an adjustable diaphragm 9 mounted in a partition 10 provided in the intermediate portion of the box 5. In the other end portion of the box 5, I mount a selenium cell 11 against which the light rays may be projected after passage through the opening 8 of diaphragm 9, and provided in the box 5 is a suitable means 12 for supporting a slide or specimen carrier 13 so that the latter is interposed between the diaphragm 9 and the selenium cell, whereby the light rays will be passed through the specimen and tempered in accordance with the color or opacity of the latter before falling upon the surface of the selenium cell.

The light focusing means preferably includes a vertical slide 14 having an opening in which the lens 7 is mounted, and an adjusting screw 15 operatively engaged with the slide 14 for adjusting the latter toward and away from lamp 6, a suitable handle 16 being provided upon an end of the screw 15 outside the box 5 for facilitating manual turning of the latter and adjustment of the slide. Suitable means is provided for indicating the various adjusted positions of the slide 14 of the light focusing means, and the same preferably consists of a suitable scale 17 mounted in a vertical position longitudinally of and upon the top of the box 5, and a pointer 18 rigid with the slide 14 and projecting upwardly through an elongated slot 19 in the top of box 5 in position to move along the scale 17. The adjustable diaphragm 9 is of conventional form including a rotatable member 20, the turning of which effects adjustment of the diaphragm sections for varying the size of the opening 8, and suitable means is provided for facilitating manual turning of the member 20 from a point outside of the box including a shaft 21 operatively geared to member 20 and operatively connected to a shaft 22 projecting outwardly of the box 5 and equipped with a suitable handle 23.

In circuit with the selenium cell 11, I provide a suitable number of battery cells 24, connected in series to give the desired voltage, and extending from one side of this source of electricity is a conductor 25 which has a switch 26 placed therein and which is connected with one side of a micro-ammeter 27. A conductor 28 extends from the other side of the micro-ammeter or registering instrument 27 to one side of the selenium cell 11, and the circuit is completed through a conductor 29 extending from the other side of the selenium cell 11 to the other side of the source 24. It is a well known fact that upon subjecting a selenium cell to light rays, the same is caused to become an electric current conductor, and that an increase in the intensity of the light to which the selenium cell is subjected is accompanied by a decrease in the resistance of the cell. Hence, when the switch 26 is closed and the selenium cell 11 is subjected to light rays, the reading upon the dial of the registering instrument 27 will depend upon the intensity of said light rays.

The incandescent lamp 6 is placed in circuit with a battery 30, and in this circuit is a switch 31 by means of which the lamp may be thrown into or out of operation. As shown, the batteries are preferably mounted within the ends of the box 5 and the instrument 27 is preferably mounted upon the exterior of the front wall of said box, while the switches 26 and 31 may be respectively operated by means of knobs 32 and 33 mounted upon the front of the box 5 as shown in Figure 1.

In operation, the slide 14 is adjusted to set the pointer coincident with the central or zero graduation of the scale 17, and a standard slide having the light absorption power of 100 per cent redness of blood is inserted in place of the container or carrier 13 and the opening of the diaphragm 9 is adjusted to the desired size. The lid of the box 5 is then closed, after which switches 26 and 31 are closed and a notation is made of the reading indicated upon the dial of the instrument 27. The substance to be tested is then placed in the container 13 and the latter is placed upon the support 12 in lieu of the standard slide. The lid of the box is again closed, and the lens 17 is then adjusted in the necessary direction for changing the focus and intensity of the light projected through the aperture of the diaphragm 9 and the specimen, until the reading on the instrument 27 is the same as it was for the standard slide. Before this latter reading is noted, the aperture of the diaphragm 9 is adjusted for the particular substance as required by the change of focus effected through adjustment of the lens 7 relative to the lamp 6. Obviously, the difference in the reading on scale 17 will represent the percentage solution when various differences in such readings have been previously established by previous readings of different known percentages.

By reason of the above, it will be seen that the present apparatus is such as to require no means for compensating for voltage changes in the lamp and selenium cell circuits, or for compensating for fluctuation in the susceptibility of the selenium cell. The voltage changes in the cells are taken care of by adjusting the lens, regardless of the strength of the light, and the ratio of focused rays passing through the diaphragm is always the same. Further, the reading on the instrument 27 is less with a reduction in intensity of light, but a corresponding increase in movement of the lens is then necessary to bring the reading of the instrument 27 to that for the standard slide. In this way, the reading will always be uniform regardless of voltage changes in the selenium cell or light circuit.

From the foregoing description it is believed that the construction and operation as well as the advantages of the present invention will be readily understood and appreciated by those skilled in the art.

Minor changes may be made without departing from the spirit and scope of the invention as claimed.

What I claim as new is:—

1. In a colorimeter apparatus, the combination of a cell of changeable resistance under the influence of light rays, a source of light, means for interposing a translucent substance between said cell and said source of light, a source of electricity in circuit with said cell, an indicating instrument in said circuit, light focusing means including a lens adjustable toward and from the source of light between the latter and the translucent substance, and adjustment indicating means for said lens.

2. In a colorimeter apparatus, the combination of a cell of changeable resistance under the influence of light rays, a source of light, means for interposing a translucent substance between said cell and said source of light, a source of electricity in a circuit with said cell, an indicating instrument in said circuit, light focusing means including a lens adjustable toward and from the source of light between the latter and the translucent substance, adjustment indicating means for said lens, and an adjustable diaphragm interposed between the lens and said translucent substance.

3. In a colorimeter apparatus, the combination of a cell of changeable resistance under the influence of light rays, a source of light, means for interposing a translucent substance between said cell and said source of light, a source of electricity in circuit with said cell, an indicating instrument in said circuit, light focusing means including a lens adjustable toward and from the source of light between the latter and the translucent substance, adjustment indicating means for said lens, a light-proof box in which all of said parts, except the instrument, are mounted, and a slide carrying said lens, said lens-adjustment indicating means embodying a scale mounted on the exterior of the box and a pointer on the slide movable along said scale, said box having an elongated slot through which said pointer projects.

In testimony whereof I affix my signature.

CHARLES N. RACE.